United States Patent
Surply et al.

(10) Patent No.: US 6,708,711 B2
(45) Date of Patent: Mar. 23, 2004

(54) AIR INLET FOR COMMERCIAL AIRCRAFT JET ENGINE NACELLE

(75) Inventors: Thierry Surply, Cornbarrieu (FR); Damien Prat, Colomiers (FR); Benoît Gagnaire, Colomiers (FR)

(73) Assignee: Airbus France, Toulouse (FR)

( * ) Notice: Subject to any disclaimer, the term of this patent is extended or adjusted under 35 U.S.C. 154(b) by 40 days.

(21) Appl. No.: 10/214,130

(22) Filed: Aug. 8, 2002

(65) Prior Publication Data

US 2003/0084936 A1 May 8, 2003

(30) Foreign Application Priority Data

Nov. 2, 2001 (FR) .............................. 01 14222

(51) Int. Cl.⁷ .............................................. B64D 33/02
(52) U.S. Cl. ..................... 137/15.1; 244/53 B
(58) Field of Search ................ 137/15.1, 15.2; 244/53 B

(56) References Cited

U.S. PATENT DOCUMENTS

| | | |
|---|---|---|
| 3,485,252 A | 12/1969 | Brown |
| 3,765,623 A | 10/1973 | Donelson et al. |
| 3,946,830 A | 3/1976 | Kutney et al. |
| 5,058,617 A | 10/1991 | Stockman et al. |
| 5,702,231 A | 12/1997 | Dougherty |
| 5,915,403 A | 6/1999 | McConachie et al. |

FOREIGN PATENT DOCUMENTS

| | | |
|---|---|---|
| DE | 850970 | 9/1952 |
| GB | 1468826 | 3/1977 |

OTHER PUBLICATIONS

English translation of Preliminary Search Report dated Jun. 26, 2002.
Search Report dated Jun. 26, 2002.
T.L. Andrew, et al., "High Speed Test Results of Subsonic, Turbofan Scarf Inlets", American Institute of Aeronautics and Astronautics, New York, No. 93–2302, pp. 1–12, 1993.
T.S. Crum, et al., "Low Speed Test Results of Subsonic, Turbofan Scarf Inlets", American Institute of Aeronautics and Astronautics, New York, No. 93–2301, pp. 1–10, 1993.
Abbott, John, "Aerodynamic Performance of Scarf Inlets", NASA Technical Memorandum 79055, pp. 1–20, Jan. 1979.

Primary Examiner—Gerald A. Michalsky
(74) Attorney, Agent, or Firm—Stevens, Davis, Miller & Mosher, LLP.

(57) ABSTRACT

An air inlet is of a scarf type and the internal profile of the upper sections of its lip includes, with respect to the identical and symmetrical horizontal sections of the lip, an internal bulge that is bigger for a larger scarf angle and that is a maximum at the upper vertical section.

9 Claims, 4 Drawing Sheets

AIR INLET FOR COMMERCIAL AIRCRAFT JET ENGINE NACELLE

The present invention relates to an air inlet for the nacelle of a commercial aircraft jet engine, the said air inlet being coaxial with the said engine and exhibiting the form of an annular lip with a rounded edge, constituting the leading edge of the said nacelle. More particularly, the air inlet of the present invention is of the chamfered type—referred to as "scarf" in technical aeronautical language—in which the leading edge is inclined with respect to the axis of the said engine, the lower part of the said lip projecting forward with respect to the upper part of the latter. A chamfered air inlet such as this, with a forward lower edge, is well known and is for example described in patent U.S. Pat. No. 3,946,830 and in the article "Aerodynamic Performance of Scarf Inlets" by John M. Abbott, NASA Technical Memorandum 79055, presented at the $17^{th}$ Aerospace Sciences Meeting at New Orleans, La., from Jan. 15 to 17, 1979.

By comparison with straight air inlets—that is to say the plane of whose leading edge is at least approximately orthogonal to the axis of the engine—chamfered air inlets, with a forward lower edge, exhibit numerous advantages, in particular as regards noise reduction, resistance to the ingestion of foreign bodies and the angle of attack of the lower edge. However, these chamfered air inlets also exhibit certain drawbacks, including very high overspeeds of the airstream feeding the engine, at the internal upper part of the lip under aircraft takeoff conditions, with or without side wind, these overspeeds possibly leading, in the event of side wind and even during a ground run, to the surging of the engine and, possibly, to damage to the latter.

The principal object of the present invention is to remedy these drawbacks and to improve chamfered air inlets, with forward lower edge, so as to avoid these excessive overspeeds.

To this end, according to the invention, the air inlet for the nacelle of a commercial aircraft jet engine, the said air inlet having its axis coincident with that of the said engine and exhibiting the form of an annular lip which comprises:
  an external annular aerodynamic surface linking up with the external surface of the said nacelle;
  an internal annular aerodynamic surface linking up with the internal surface of the said nacelle and channeling the air to the said engine, the said internal annular aerodynamic surface comprising an annular throat and forming at least in part a diffuser for the said engine; and
  a plane annular leading edge formed at the link-up of the said external and internal annular aerodynamic surfaces,
  so that any section of the said annular lip through a diametral plane comprises an external profile, an internal profile, a throat and a leading edge corresponding respectively to the traces, in the said diametral plane, of the said external and internal annular aerodynamic surfaces, of the annular throat and of the said annular leading edge,
  the said air inlet being symmetric with respect to its vertical diametral plane and being of the chamfered type with the lower part of the said lip forward with respect to the upper part of the latter and the said annular leading edge inclined with respect to the said axis, the inclination of the said annular leading edge being defined, in the said vertical diametral plane, by the scarf angle Sc between the trace of the plane of the said leading edge and the direction perpendicular to the said axis, is noteworthy in that:
  with respect to the two horizontal sections, which are identical and symmetrical, of the said lip, the internal profile of the upper sections of the said lip comprises an internal bulge in the direction of the said axis, the said internal bulge extending on either side of the throat of the said horizontal sections;
  the larger the scarf angle Sc, the bigger the said internal bulge; and
  the said internal bulge is a maximum at the upper vertical section of the said lip and decreases, progressively and symmetrically, toward the said horizontal sections, where it disappears.

Thus, by virtue of the present invention, the said internal annular aerodynamic surface of the air inlet is thickened, at its upper part, thereby allowing the incident airstream feeding the engine to pass smoothly around the upper part of the leading edge and consequently lowering the corresponding excessive overspeeds of this incident airstream.

It will be pointed out that each section of the said annular lip through a diametral plane making an angle $\theta$ with respect to the vertical diametral plane may be defined by:
  the rate of contraction $CR(\theta)$ which is equal to the square of the ratio of the distance of the leading edge from the axis of the engine and of the distance of the throat from the said axis of the engine;
  the distance $a(\theta)$, parallel to the said axis, between the throat and the leading edge;
  the distance $b(\theta)$, perpendicular to the said axis, between the throat and the leading edge; and
  the ratio $r(\theta)=a(\theta)/b(\theta)$.

In the present invention, the rate of contraction $CR(\theta)$ and the ratio $r(\theta)$ (with $\theta=90°$) of the horizontal sections of the said lip are considered to have base values equal to CRb and to rb respectively.

In this case, in an advantageous embodiment, the air inlet in accordance with the present invention may exhibit the following features:
  the rate of contraction $CR(0)$ of the upper vertical section is equal to:

$$CR(0)=CRb+a1\times Sc,$$

in which expression a1 is a constant;
  the ratio $r(0)$ of the upper vertical section is equal to:

$$r(0)=rb+a2\times Sc,$$

in which expression a2 is a constant,
  the rate of contraction $CR(\theta)$ of the upper section of the lip through the said diametral plane making the angle $\theta$ with the vertical plane satisfies the equation:

$$CR(\theta)=CRb+[CR(0)-CRb]\times\cos\theta$$

and
  the ratio $r(\theta)$ of the said upper section of the lip through the said diametral plane making the angle $\theta$ with the vertical plane satisfies the equation:

$$r(\theta)=rb+[r(0)-rb]\times\cos\theta.$$

When the scarf angle Sc is expressed in degrees, the constant a1 may have a value lying between 0.002 and 0.008 and the constant a2 between −0.03 and 0.

In order to make the leading edge of the upper part of the air inlet in accordance with the present invention yet more rounded and thus improve the low-speed flow of the incident air, it is advantageous that:

with respect to the two horizontal sections of the said lip, the external profile of the upper sections of the said lip comprise an external bulge commencing behind the leading edge;

the larger the scarf angle Sc, the bigger the said external bulge; and the said external bulge be a maximum at the upper vertical section of the lip and decrease, progressively and symmetrically, toward the said horizontal sections, where it disappears.

If, for each upper section of the said annular lip through a diametral plane, we denote by $c(\theta)$ the distance, perpendicular to the said axis, between the leading edge and the point of the said external profile, whose distance $d(\theta)$ from the said leading edge, parallel to the said axis, is equal to a tenth of the distance of the leading edge from the axis of the engine, the ratio $\rho(\theta)=c(\theta)/d(\theta)$, with $\theta=90°$, corresponding to the horizontal sections presenting the base value $\rho b$, such an external bulge may be characterized by the following features:

the ratio $\rho(0)$ of the upper vertical section is equal to $$\rho(0)=\rho b+a3 \times Sc,$$

in which expression a3 is a constant; and the ratio $\rho(\theta)$ of the upper section of the lip through the said diametral plane making the angle $\theta$ with the vertical plane satisfies the equation:

$$\rho(\theta)=\rho b+[\rho(0)-\rho b]\times\cos\theta.$$

The scarf angle Sc being expressed in degrees, the constant a3 may have a value lying between 0 and 0.04.

Preferably, in the air inlet in accordance with the present invention:

the internal profile of the lower sections of the said lip may exhibit a greater rate of contraction than the base rate of contraction CRb; and this greater rate of contraction is a maximum at the lower vertical section of the said lip and decreases, progressively and symmetrically, toward said horizontal sections where it takes the value CRb.

Moreover, to yet further improve the conditions of inlet of the airstream into the said air inlet in accordance with the present invention, it is advantageous that:

the internal profile of the lower sections of the said lip comprise, at the rear of the leading edge, a thinning imposing a rearward retreated position for the throat;

the larger the scarf angle Sc, the bigger the said thinning; and the said thinning be a maximum at the lower vertical section of the said lip and decrease, progressively and symmetrically, toward the said horizontal sections, where it disappears.

The figures of the appended drawing will elucidate the manner in which the invention may be embodied. In these figures, identical references designate similar elements.

Figure 1:
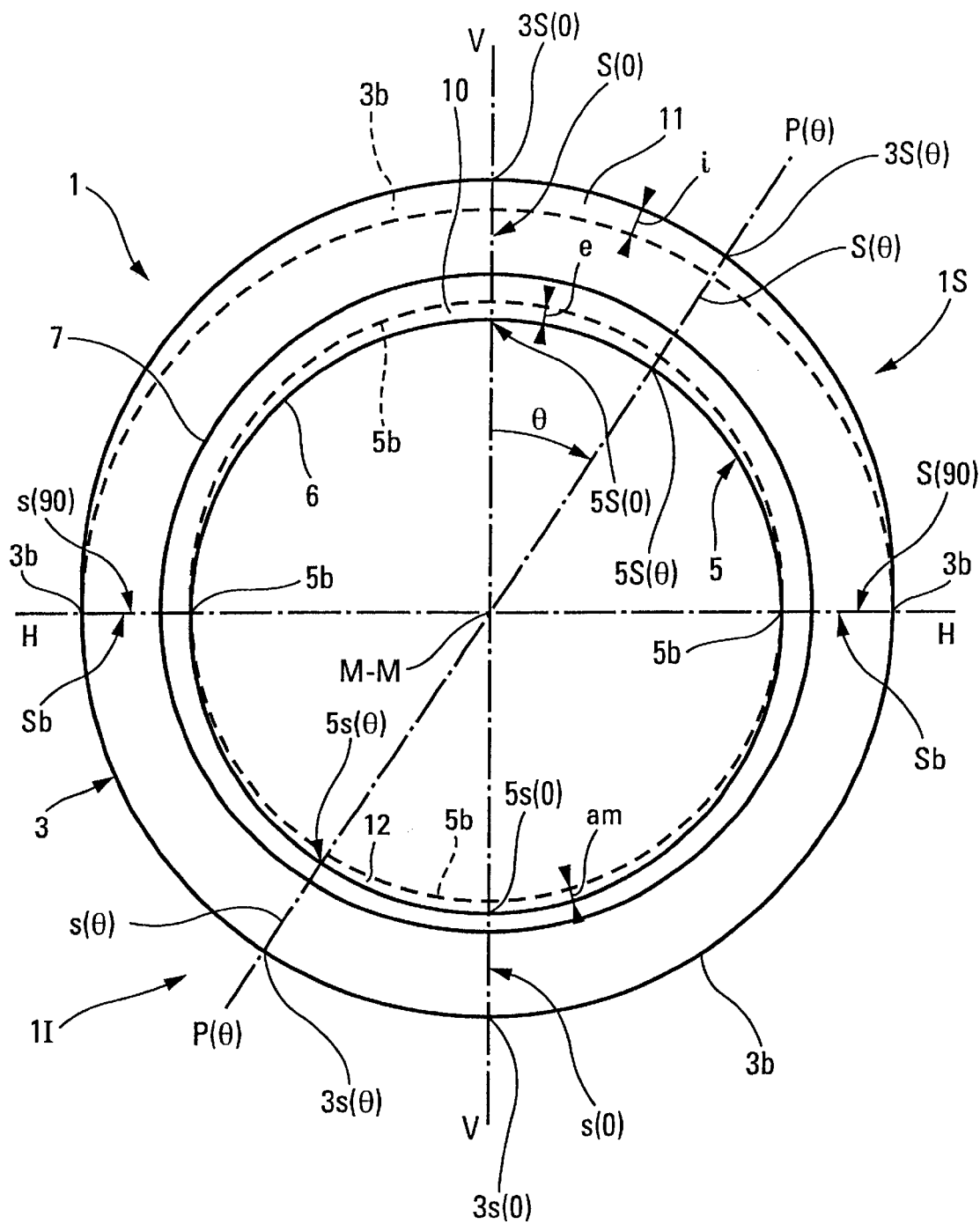
FIG. 1 is a diagrammatic front view of an air inlet in accordance with the present invention.
Figure 2:
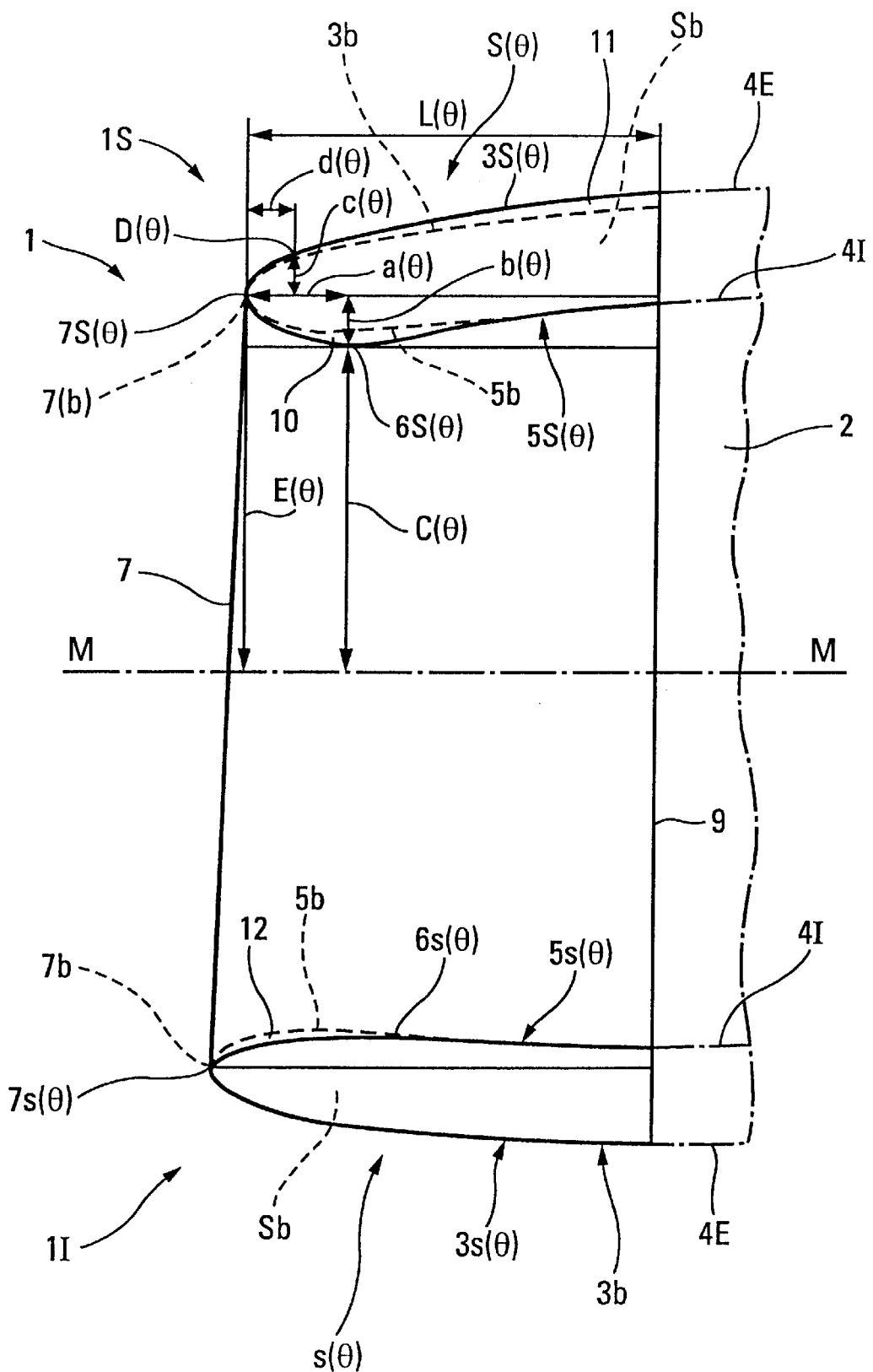
FIG. 2 is a diagrammatic diametral section through the air inlet of FIG. 1, through a diametral plane $P(\theta)$ inclined by the angle $\theta$ with respect to the vertical diametral plane V—V.
Figure 3:
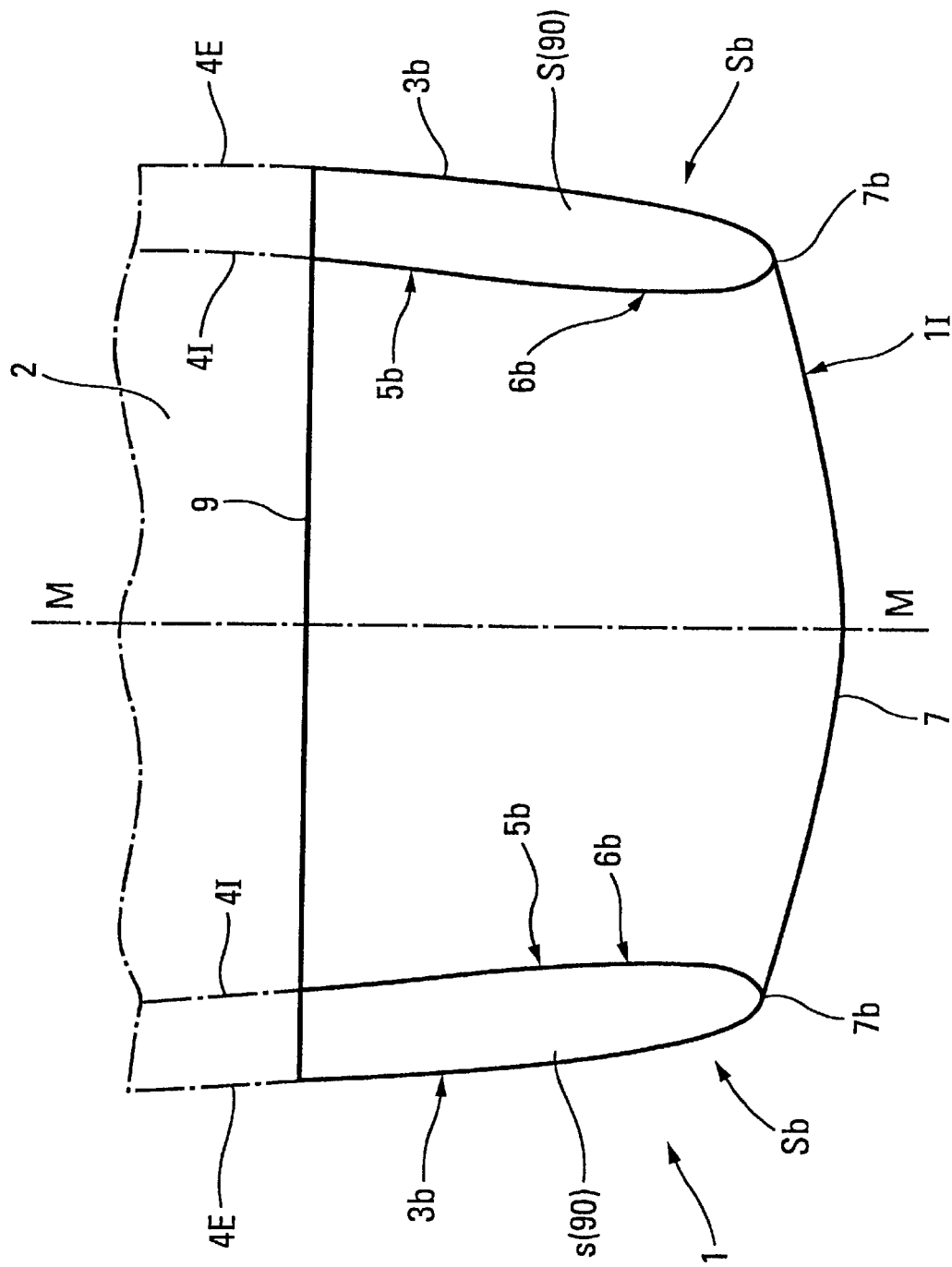
FIG. 3 is a diagrammatic diametral section through the air inlet of FIG. 1, through the horizontal diametral plane H—H.
Figure 4:
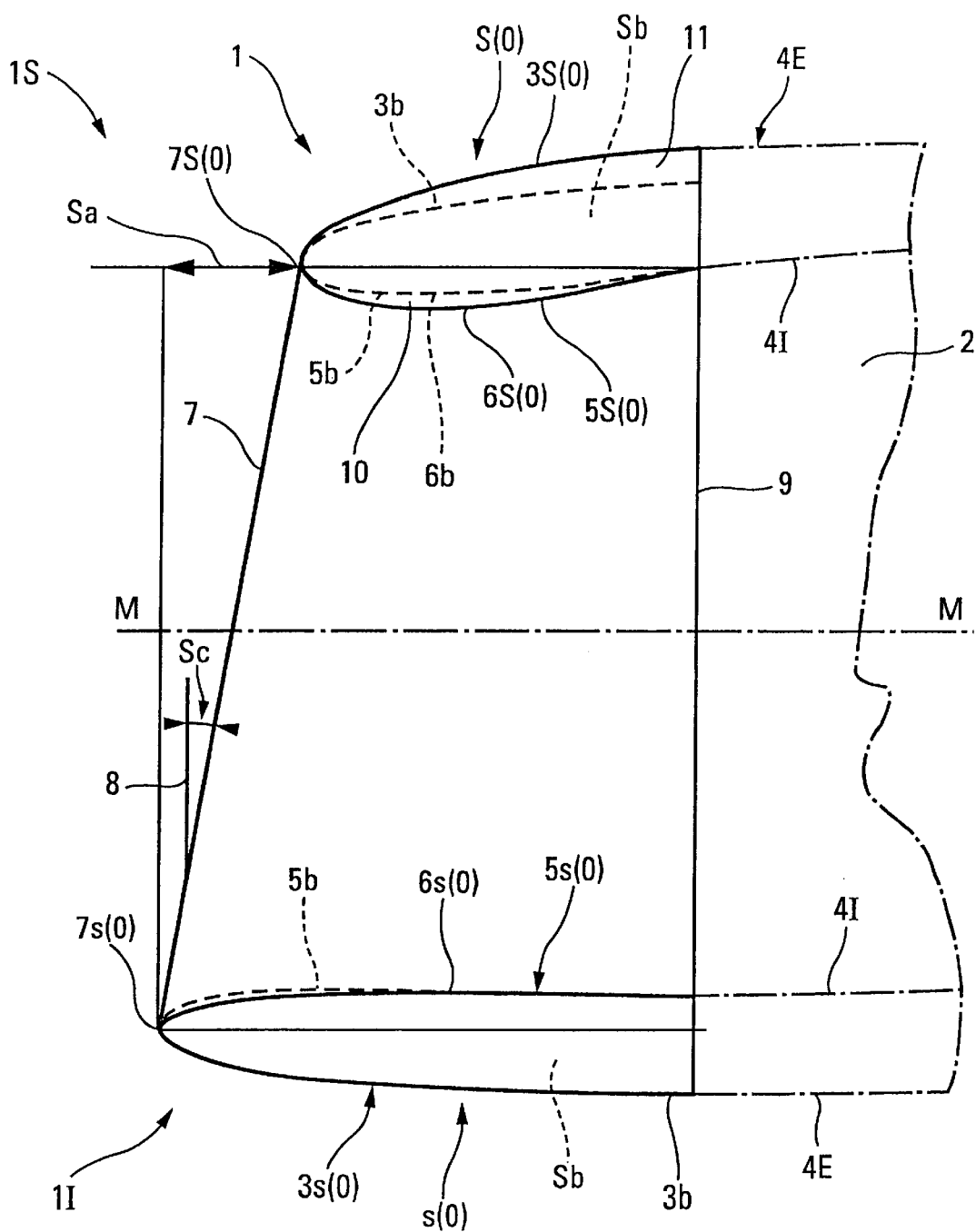
FIG. 4 is a diagrammatic diametral section through the air inlet of FIG. 1, through the vertical diametral plane V—V.

The air inlet, in accordance with the present invention and shown by FIGS. 1 to 4, exhibits the form of an annular lip 1 and is intended to feed air to a commercial aircraft jet engine (not represented), the said engine being housed in a nacelle 2, indicated diagrammatically by dashed lines in FIGS. 2 to 4. The annular lip 1 is centered on the axis M—M of the said engine and it is symmetric with respect to the vertical diametral plane V—V. It forms the annular leading edge of the nacelle 2.

The annular lip 1 comprises an external annular aerodynamic surface 3 linking up with the external surface 4E of the nacelle 2 and an internal annular aerodynamic surface 5 linking up with the internal surface 4I of the said nacelle 2 and channeling the air to the said engine. The internal annular aerodynamic surface 5 comprises a throat 6, formed by the geometrical locus of those points of this surface 5 at which the tangent is parallel to the axis M—M, so as to form a diffuser for the said engine. The said aerodynamic surfaces 3 and 5 link up, on the opposite side from the nacelle 2, along an annular and rounded aerodynamic leading edge 7.

The air inlet formed by the annular lip 1 is of scarf type, that is to say exhibits a chamfered form, the leading edge 7 being inclined with respect to the axis M—M and the lower part 1I of the said annular lip 1 making a projection Sa forward with respect to the upper part 1S of the latter. In the standard manner, the inclination of the leading edge 7 is defined, in the vertical diametral plane V—V (see FIG. 4), by the scarf angle Sc, formed between the leading edge 7 and the direction 8 perpendicular to the axis M—M.

When considering the intersection of the said annular lip 1 through a diametral section $P(\theta)$, inclined by the angle $\theta$ with respect to the vertical diametral plane V—V, one obtains an upper section $S(\theta)$ corresponding to the said upper part 1S, and a lower section $s(\theta)$ corresponding to the said lower part 1I (see FIGS. 1 and 2). It will be pointed out that, owing to the fact that the annular lip 1 is symmetric with respect to the vertical diametral plane V—V, it is sufficient to vary $\theta$ between 0 and 90° to define the said annular lip 1 completely in terms of profile.

Each upper section $S(\theta)$ is formed by an external profile $3S(\theta)$ and by an internal profile $5S(\theta)$ corresponding respectively to the traces of the external 3 and internal 5 annular aerodynamic surfaces. The external profile $3S(\theta)$ and the internal profile $5S(\theta)$ join up at the leading edge $7S(\theta)$, which is itself the trace of the leading edge 7 in the lower section $S(\theta)$. The trace of the throat 6 in this lower section forms the throat $6S(\theta)$ of the internal profile $5S(\theta)$.

Likewise, each lower section $s(\theta)$ is formed by an external profile $3s(\theta)$ and by an internal profile $5s(\theta)$ corresponding respectively to the traces of the external 3 and internal 5 annular aerodynamic surfaces. The external profile $3s(\theta)$ and the internal profile $5s(\theta)$ join up at the leading edge $7s(\theta)$, which is itself the trace of the leading edge 7 in the lower section $s(\theta)$. The trace of the throat 6 in this lower section forms the throat $6s(\theta)$ of the internal profile $5s(\theta)$.

In addition to its length $L(\theta)$, determined by the distance parallel to the axis M—M between its leading edge and the plane 9 on which the lip 1 is linked to the nacelle 2, each section through a plane $P(\theta)$ and, in particular, each upper section $S(\theta)$ can be defined by:

the distance $E(\theta)$ of the leading edge $7S(\theta)$ from the axis M—M;

the distance $C(\theta)$ of the throat $6S(\theta)$ from the axis M—M;

the distance $a(\theta)$, parallel to the axis M—M, between the throat $6S(\theta)$ and the leading edge $7S(\theta)$;

the distance b(θ), perpendicular to the axis M—M, between the throat 6S(θ) and the leading edge 7S(θ);

the distance c(θ), perpendicular to the axis M—M, between the leading edge 7S(θ) and the point D(θ) of the external profile 3S(θ), which is itself a length d(θ) equal to a tenth of the distance E(θ) away from the said leading edge 7S(θ), parallel to the axis M—M;

the rate of contraction CR(θ), which is equal to the square of the ratio E(θ)/C(θ);

the ratio r(θ)=a(θ)/b(θ); and the ratio ρ(θ)=c(θ)/d(θ).

It will be pointed out that the upper sections S(θ) and the lower sections s(θ) are separated from one another by the horizontal diametral plane H—H which corresponds to the diametral sectional plane P(θ) for which the angle θ is equal to 90° and which may be designated by P(90).

In this horizontal diametral plane P(90) or H—H, the two sections S(90) and s(90) are identical and symmetric with respect to the axis M—M. They constitute a base for the lip 1 and are designated hereinbelow by Sb and are formed by an external profile 3b and by an internal profile 5b corresponding respectively to the traces of the external 3 and internal 5 annular aerodynamic surfaces in the plane H—H. In each section Sb, the external profile 3b and internal profile 5b join up at the leading edge 7b, which is itself the trace of the leading edge 7 in the said plane. The traces of the throat 6 in the plane H—H form the throats 6b of the internal profiles 5b.

The rate of contraction CR(90) and the ratio r(90) of the horizontal base section Sb are designated hereinbelow by CRb and rb, respectively.

In FIGS. 2 and 4, the base section Sb has been represented dotted superimposed on the upper and lower sections. Likewise, a lip which would have a constant section constituted by the said base section Sb has been superimposed dotted, in FIG. 1, on the lip 1 of the invention.

FIG. 4, which represents a vertical diametral section through the lip 1, corresponds to the diametral sectional plane V—V or P(0), for which the angle θ is zero. In this sectional plane P(0), are therefore again found, as described hereinabove for the sectional plane P(θ):

an upper section S(0), with an external profile 3S(0), an internal profile 5S(0), a throat 6S(0) and a leading edge 7S(0); and a lower section s(0), with an external profile 3s(0), an internal profile 5s(0), a throat 6s(0) and a leading edge 7s(0).

As is illustrated by FIGS 1, 2 and 4, according to the most important feature of the present invention, the internal annular aerodynamic surface 5 of the upper sections S(θ) comprises an internal bulge 10 toward the axis M—M, such a bulge being delimited between the profiles 5b and 5S(θ). The internal bulge 10 extends on either side of the throat 6b of the said base section Sb and its thickness e (between the profiles 5b and 5S(θ)) is all the larger the larger the scarf angle Sc. Moreover, the thickness e is a maximum at the vertical upper section S(0) and decreases, progressively and symmetrically, toward the horizontal sections s(90) and s(90), where the said internal bulge 10 disappears.

In an advantageous embodiment:

the rate of contraction CR(0) of the upper vertical section S(0) of the air inlet in accordance with the present invention is equal to $$CR(0)=CRb+a1 \times Sc,$$

a1 being a constant, whose value lies for example between 0.002 and 0.008 if the scarf angle Sc is expressed in degrees;

the ratio r(0) of the upper vertical section is equal to:

$$r(0)=rb+a2 \times Sc,$$

in which expression a2 is a constant, whose value lies for example between −0.03 and 0 if the scarf angle Sc is expressed in degrees;

the rate of contraction CR(θ) of the upper section S(θ) of this air inlet with respect to the said diametral plane P(θ) making the angle θ with the vertical diametral plane V—V satisfies the equation $$CR(\theta)=CRb+[CR(0)-CRb] \times \cos\theta;$$

and the ratio r(θ) of each upper section of the air inlet through the said diametral plane P(θ) satisfies the equation:

$$r(\theta)=rb+[r(0)-rb] \times \cos\theta.$$

Moreover, with respect to the said symmetric longitudinal sections S(90) and s(90) of the air inlet of the invention, the external profile 3 of the upper sections S(θ) of this air inlet comprises an external bulge 11 commencing behind the leading edge 7S(θ) and enveloping the external profile 3b. Moreover, the thickness i of the said external bulge 11, lying between the profiles 3b and 3S(θ)

is all the bigger the larger the scarf angle Sc; and is a maximum at the upper vertical section S(0) of the said air inlet and decreases, progressively and symmetrically, toward the horizontal sections S(90) and s(90) of this air inlet, where said external bulge 11 disappears.

The base sections S(90) and s(90) exhibiting a base value ρb for the ratio ρ(θ), it is advantageous for this purpose that:

the ratio ρ(0) of the upper vertical section S(0) of the said air inlet in accordance with the invention be equal to $$\rho(0)=\rho b+a3 \times Sc$$

a3 being a constant, whose value lies between 0 and 0.04, if the scarf angle Sc is expressed in degrees; and the ratio ρ(θ) of the upper section of the said air inlet through the diametral plane making the angle θ with the vertical plane (V—V) satisfy the equation:

$$\rho(\theta)+\rho b+[\rho(0)-\rho b] \times \cos\theta$$

According to another feature of the present invention, the internal profile 5s(θ) of the lower sections s(θ) of the lip 1 may exhibit a greater rate of contraction cr(0) (defined by analogy with what was mentioned hereinabove as the square of the ratio of the distances E(θ) and C(θ) relating to the said lower sections s(θ) than the base rate of contraction CRb defined hereinabove for the base section Sb, this rate of contraction cr(θ) being a maximum at the lower vertical section s(0) of the lip 1 and decreasing, progressively and symmetrically, toward the said horizontal sections S(90) and s(90), where it takes the value CRb.

Whether or not this last feature exists in the lip 1 of the air inlet in accordance with the present invention, it is moreover advantageous that:

the internal profile 5s(θ) of the lower sections s(θ) of the lip comprise, at the rear of the leading edge 7s(θ) and with respect to the base section 5b, a thinning 12 imposing a rearward retreated position for the throat 6s(θ);

the said thinning 12 exhibit a thickness am which is all the larger the larger the scarf angle Sc; and the said thinning 12 be a maximum at the lower vertical section s(0) of the said lip 1 and decrease, progressively and symmetrically, toward the said horizontal sections S(90) and s(90), where it disappears.

What is claimed is:

1. Air inlet for the nacelle of a commercial aircraft jet engine, said air inlet having its axis (M—M) coincident with that of said engine and exhibiting the form of an annular lip which comprises:
   an external annular aerodynamic surface for linking up with the external surface of said nacelle;
   an internal annular aerodynamic surface for linking up with the internal surface of said nacelle and channeling the air to said engine, said internal annular aerodynamic surface comprising an annular throat and forming at least in part a diffuser for the said engine; and
   a plane annular leading edge formed at the link-up of said external and internal annular aerodynamic surfaces, so that any section of said annular lip through a diametral plane comprises an external profile, an internal profile, a throat and a leading edge corresponding respectively to the traces, in said diametral plane, of said external and internal annular aerodynamic surfaces, of the annular throat and of said annular leading edge,
   said air inlet being symmetric with respect to its vertical diametral plane (V—V) and being of the chamfered type with the lower part of said lip forward with respect to the upper part of the latter and said annular leading edge inclined with respect to said axis (M—M), the inclination of said annular leading edge being defined, in the said vertical diametral plane (V—V), by the scarf angle Sc between the trace of the plane of said leading edge and the direction (8) perpendicular to said axis, wherein:
      with respect to the two horizontal sections (Sb) of said lip, the internal profile (5S($\theta$)) of the upper sections (S($\theta$)) of said lip comprises an internal bulge in the direction of said axis, said internal bulge extending on either side of the throat of said horizontal sections (Sb);
      the larger said scarf angle Sc, the bigger the internal bulge; and
      said internal bulge is a maximum at the upper vertical section S(0) of the said lip and decreases, progressively and symmetrically, toward said horizontal sections (Sb), where it disappears.

2. Air inlet according to claim 1, in which each section of said annular lip through a diametral plane P($\theta$) making an angle $\theta$ with respect to said vertical diametral plane (V—V) is defined by:
   the rate of contraction CR($\theta$) which is equal to the square of the ratio of the distance E($\theta$) of the leading edge from said axis and of the distance C($\theta$) of the throat from said axis;
   the distance a($\theta$), parallel to said axis, between the throat and the leading edge;
   the distance b($\theta$), perpendicular to said axis, between the throat and the leading edge; and
   the ratio r($\theta$)=a($\theta$)/b($\theta$);
   the rate of contraction CR($\theta$) and said ratio r($\theta$) having the base values CRb and rb respectively for said horizontal sections of said lip, for which $\theta$=90°, wherein:
   the rate of contraction CR(0) of the upper vertical section S(0) is equal to $$CR(0)=CRb+a1 \times Sc,$$

in which expression a1 is a constant;
   the ratio r(0) of the upper vertical section is equal to:

$$r(0)=rb+a2 \times Sc,$$

in which expression a2 is a constant,
   the rate of contraction CR($\theta$) of the upper section S($\theta$) of the lip through said diametral plane P($\theta$) making the angle $\theta$ with the vertical plane satisfies the equation:

$$CR(\theta)=CRb+(CR(0)-CRb)\times \cos \theta;$$

and
   the ratio r($\theta$) of said upper section S($\theta$) of the lip through said diametral plane P($\theta$) making the angle $\theta$ with the vertical plane satisfies the equation:

$$r(\theta)=rb+(r(0)-rb)\times \cos \theta.$$

3. Air inlet according to claim 2, wherein, with the scarf angle Sc being expressed in degrees, the constant a1 has a value lying between 0.002 and 0.008.

4. Air inlet according to claim 2, wherein, with the scarf angle Sc being expressed in degrees, the constant a2 has a value lying between −0.03 and 0.

5. Air inlet according to claim 2, wherein:
   the internal profile (5s($\theta$)) of the lower sections (s($\theta$)) of said lip exhibits a greater rate of contraction than the base rate of contraction CRb; and
   this greater rate of contraction is a maximum at the lower vertical section (s(0)) of said lip and decreases, progressively and symmetrically, toward said horizontal sections (Sb) where it takes the value CRb.

6. Air inlet according to claim 1, wherein:
   with respect to the two horizontal sections (Sb) of said lip, the external profile (3S($\theta$)) of the upper sections S($\theta$) of said lip comprises an external bulge commencing behind the leading edge (7S($\theta$));
   the larger said scarf angle Sc, the bigger the external bulge; and
   said external bulge is a maximum at the upper vertical section S(0) of the lip and decreases, progressively and symmetrically, toward said horizontal sections (Sb), where it disappears.

7. Air inlet according to claim 6, in which, for each upper section S($\theta$), c($\theta$) denotes the distance, perpendicular to said axis, between the leading edge (7S($\theta$)) and the point D($\theta$) of said external profile (3S($\theta$)), whose distance d($\theta$) from said leading edge, parallel to said axis, is equal to a tenth of the distance E($\theta$) of the leading edge from said axis (M—M), the ratio $\rho(\theta)$=c($\theta$)/d($\theta$) presenting the base value $\rho$b for said horizontal sections of said lip, wherein:
   the ratio $\rho(\theta)$ of the upper vertical section S($\theta$) is equal to $$\rho(0)=\rho b+a3 \times Sc,$$

in which expression a3 is a constant and Sc is the scarf angle; and
   the ratio $\rho(\theta)$ of the upper section S($\theta$) of the lip through the diametral plane making the angle $\theta$ with the vertical plane (V—V) satisfies the equation:

$$\rho(\theta)=\rho b+(\rho(0)-\rho b)\times \cos \theta.$$

8. Air inlet according to claim 7, wherein, with the scarf angle Sc being expressed in degrees, the constant a3 has a value lying between 0 and 0.04.

9. Air inlet according to claim 1, wherein:
the internal profile ($5s(\theta)$) of the lower sections ($s(\theta)$) of said lip comprises, at the rear of the leading edge $7s(\theta)$, a thinning imposing a rearward retreated position for the throat ($6s(\theta)$);
the larger the scarf angle Sc, the bigger the thinning;
said thinning is a maximum at the lower vertical section $s(0)$ of said lip and decreases, progressively and symmetrically, toward said horizontal sections (Sb), where it disappears.

\* \* \* \* \*